United States Patent
Nakaya

[11] Patent Number: 5,974,216
[45] Date of Patent: Oct. 26, 1999

[54] OPTICAL WAVEGUIDE ELECTRICALLY CONTROLLED VARIABLE ATTENUATOR

[75] Inventor: Ken-ichi Nakaya, Tokyo, Japan

[73] Assignee: NEC Corporation, Tokyo, Japan

[21] Appl. No.: 09/021,391

[22] Filed: Feb. 10, 1998

[30] Foreign Application Priority Data

Feb. 13, 1997 [JP] Japan ................................ 9-044719

[51] Int. Cl.$^6$ .................................................. G02B 6/00
[52] U.S. Cl. ............................................................. 385/140
[58] Field of Search ................................ 385/41, 11, 14, 385/16, 40, 130, 9, 27; 359/900

[56] References Cited

U.S. PATENT DOCUMENTS

| | | | |
|---|---|---|---|
| 4,445,751 | 5/1984 | Divens et al. . | |
| 4,664,484 | 5/1987 | Hines . | |
| 4,674,829 | 6/1987 | Bulmer et al. ............................ | 485/41 |
| 4,690,488 | 9/1987 | Gee et al. .................................. | 385/41 |
| 4,766,588 | 8/1988 | Falk ........................................... | 359/139 |
| 4,789,212 | 12/1988 | Bristow et al. . | |
| 4,865,408 | 9/1989 | Korotky ..................................... | 385/41 |
| 4,871,223 | 10/1989 | Auracher et al. . | |
| 5,002,354 | 3/1991 | Koai .......................................... | 385/21 |
| 5,090,790 | 2/1992 | Zucker ...................................... | 385/130 |
| 5,103,333 | 4/1992 | Koai .......................................... | 359/140 |
| 5,148,507 | 9/1992 | Tanisawa .................................. | 385/41 |
| 5,375,180 | 12/1994 | Murphy ..................................... | 385/21 |

FOREIGN PATENT DOCUMENTS

| | | |
|---|---|---|
| 62-36631 | 2/1987 | Japan . |
| 64-82013 | 3/1989 | Japan . |
| 1-239503 | 9/1989 | Japan . |
| 2-262127 | 10/1990 | Japan . |
| 3-215804 | 9/1991 | Japan . |
| 4-50926 | 2/1992 | Japan . |
| 5-241209 | 9/1993 | Japan . |
| 6-186451 | 7/1994 | Japan . |

OTHER PUBLICATIONS

M. Kondo et al., "Rendering an LiNbO$_3$ optical waveguide switch independent of polarization", *Soc. Electronics Information and Communications,* Semiconductor Materials Section, National Conf. Mar. 1987.

*Primary Examiner*—Akm E. Ullah
*Attorney, Agent, or Firm*—Young & Thompson

[57] ABSTRACT

In an optical waveguide electrically controlled variable attenuator using a dielectric substrate, light which has entered from the input port is split into TM mode and TE mode by a polarization beam splitter. After these modes are variably attenuated by respective directional coupler switches, a resulting TM mode and TE mode are coupled by a polarization coupler and output from the output port. Control voltages of the directional coupler switches are adjusted to a fixed ratio in such a manner that equal attenuation characteristics will be obtained for both the TM and TE modes. This makes it possible to obtain an attenuation characteristic that is independent of the polarized light.

10 Claims, 8 Drawing Sheets

OPTICAL WAVEGUIDE ELECTRICALLY CONTROLLED VARIABLE ATTENUATOR

FIELD OF THE INVENTION

This invention relates to optical waveguide devices used in ultra-high-speed backbone transmission communications systems. More particularly, the invention relates to an electrically controlled variable attenuator of optical waveguide type.

BACKGROUND OF THE INVENTION

In the light of the present invention following discussions on the related art are given.

The practical application of optical communication systems in recent years has been accompanied by demand for highly sophisticated communications systems of greater capacity and increased functionality. This has made it necessary to add on new functions for generating optical signals at higher speeds, for wavelength multiplexing in the same optical transmission path and for the changeover and switching of optical transmission paths. In particular, the practical application of optical fiber amplifiers has heightened expectations in regard to wavelength division multiplexing (WDM)-technology.

In order to realize WDM transmission, reducing the wavelength dependence of optical fiber amplifier gain is essential. One method of achieving this is to optimize the gain wavelength dependence of an erbium-doped fiber (EDF). To accomplish this, however, it is required that the gain of the EDF be controlled so as to be held constant.

When the gain of an EDF is held constant, however, a fluctuation in the level of the input signal to the optical fiber amplifier appears in the output stage. If multistage transmission is carried out, level fluctuation in the receiver stage becomes large in magnitude, making application of this technique to an actual apparatus difficult.

Figure 4:
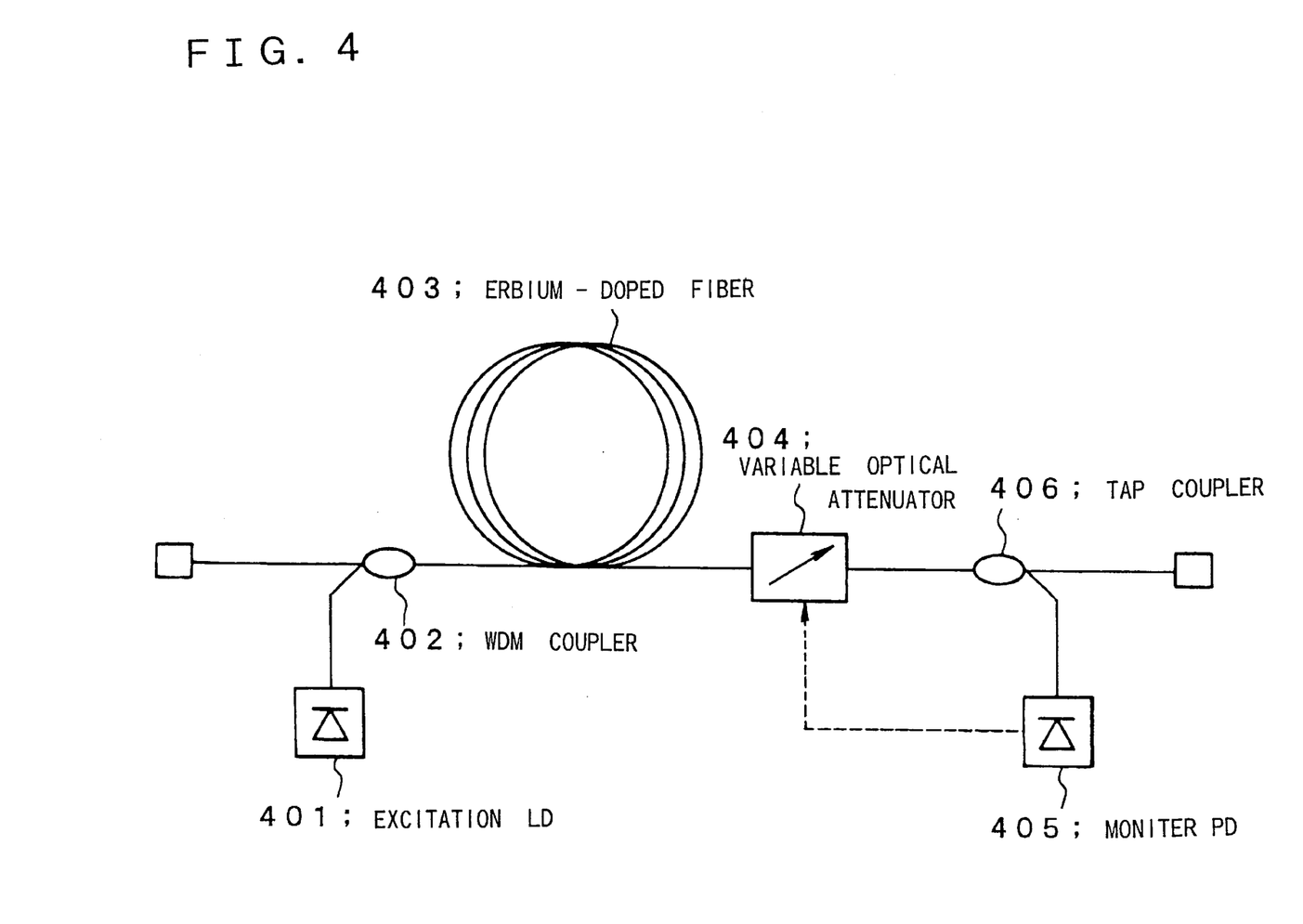
FIG. 4 is a diagram showing the construction of an optical fiber amplifier and illustrating an embodiment in which the attenuator of the present invention is applied to an optical fiber amplifier.

In an effort to solve this problem, an arrangement, e.g., as shown in FIG. 4 has been proposed. Specifically, the fluctuation in the output level of an optical fiber amplifier is compensated for by an electrically controlled variable optical attentuator 404 in which feedback control is possible. Incident light is multiplexed onto excitation light from an excitation laser diode (LD) 401 by a WDM coupler 402, and the resulting signal is amplified by an erbium-doped optical fiber 403. The exiting light is variably attenuated in the variable optical attenuator 404 by a control signal voltage from an optical sensor 405 that monitors the emitted light, and the attenuated light is output via a tap coupler 406.

The structure and functions of the optical waveguide electrically controlled variable attenuator according to the prior art will now be described.

Figure 5:
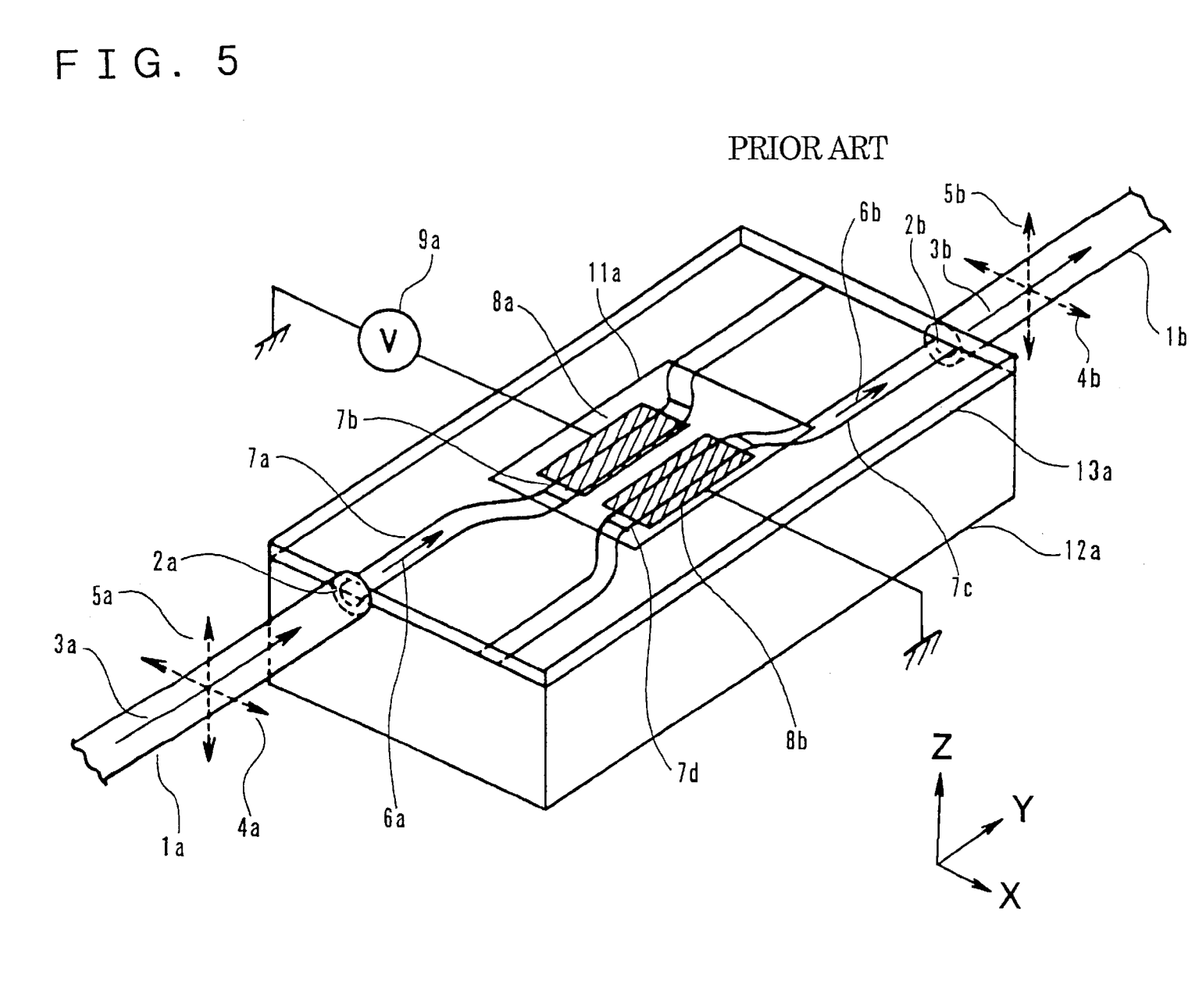
FIG. 5 is a diagram showing an example of the construction of optical waveguide electrically controlled variable attenuator according to the prior art.

FIG. 5 illustrates an example of an optical waveguide electrically controlled variable attenuator using an optical switch of directional coupler type according to the prior art. The arrangement depicted in FIG. 5 is described in "Rendering an LiNbO$_3$ Optical Waveguide Switch Independent of Polarization" by Mitsukazu Kondo, Yasuhisa Tanizawa, Masaaki Iwasaki, Yoshinori Ota, Tsutomu Aoyama and Roh Ishikawa, Society of Electronics Information and Communications, Semiconductor Materials Section, National Conference, published March, 1987, pp. 2~140.

As shown in FIG. 5, an optical waveguide 7 is fabricated in the shape illustrated in the surface of a substrate 12a comprising a lithium niobate (LiNbO$_3$) Z plate (Z-cut crystal). A portion having an index of refraction slightly higher than that of the substrate 12a is an optical waveguide 2. The optical waveguide 7 is formed by Titanium (Ti) thermal diffusion method into the substrate. A buffer layer 13a consisting of silicon dioxide (SiO$_2$) is provided on the optical waveguide 7, and control electrodes 8a, 8b are provided on the buffer layer 13a.

With this optical waveguide electrically controlled variable attenuator according to the prior art, signal light 3a from an erbium-doped fiber impinges upon an input port 2a. The component of the electric field of the entrant light that is parallel to the substrate is TE (Transverse Electric) mode 4, and the component of the electric field of the entrant light that is orthogonal to the substrate is TM (Transverse Magnetic) mode 5.

In a case where voltage is not being applied upon the control electrodes 8a, 8b, guided light 6a that has entered from the input port 2a is acted upon in a directional coupler 11a in such a manner that optical power is transferred from optical waveguide 7b to the adjacent optical waveguide 7d, travels through optical waveguide 7c on the output side and exits to an output fiber 1b from an output port 2b.

In this optical waveguide electrically controlled variable attenuator according to the prior art, the directional coupler switch 11a is designed to have such a switch length (the length of the switch decided by optical waveguides 7b, 7d, referred to also as "complete coupling length") that the optical power will be transferred completely between the optical waveguides 7a, 7d. When voltage V (9a) is applied upon the control electrodes 8a, 8b in the directional coupler switch 11a, the index of refraction of the optical waveguides 7b, 7d immediately underlying the electrodes changes owing to electro-optic effects, as a result of which the intensity of the output light 3b changes.

Intensity P of the output light 3b in relation to the control voltage V(9a) is represented by Equation (1) below. For example, see "Optical Integrated Circuits", Nishihara et al., published by Ohm-sha, 1985.

$$P(v) = 10 \log\left[\left(\frac{1}{1+\left(\frac{\Delta(v)}{\chi}\right)^2}\right)\sin^2\left(\sqrt{\chi^2 + \Delta(v)^2}\, L\right)\right] \quad (1)$$

$$\Delta v \propto \gamma, v$$

Figure 6:
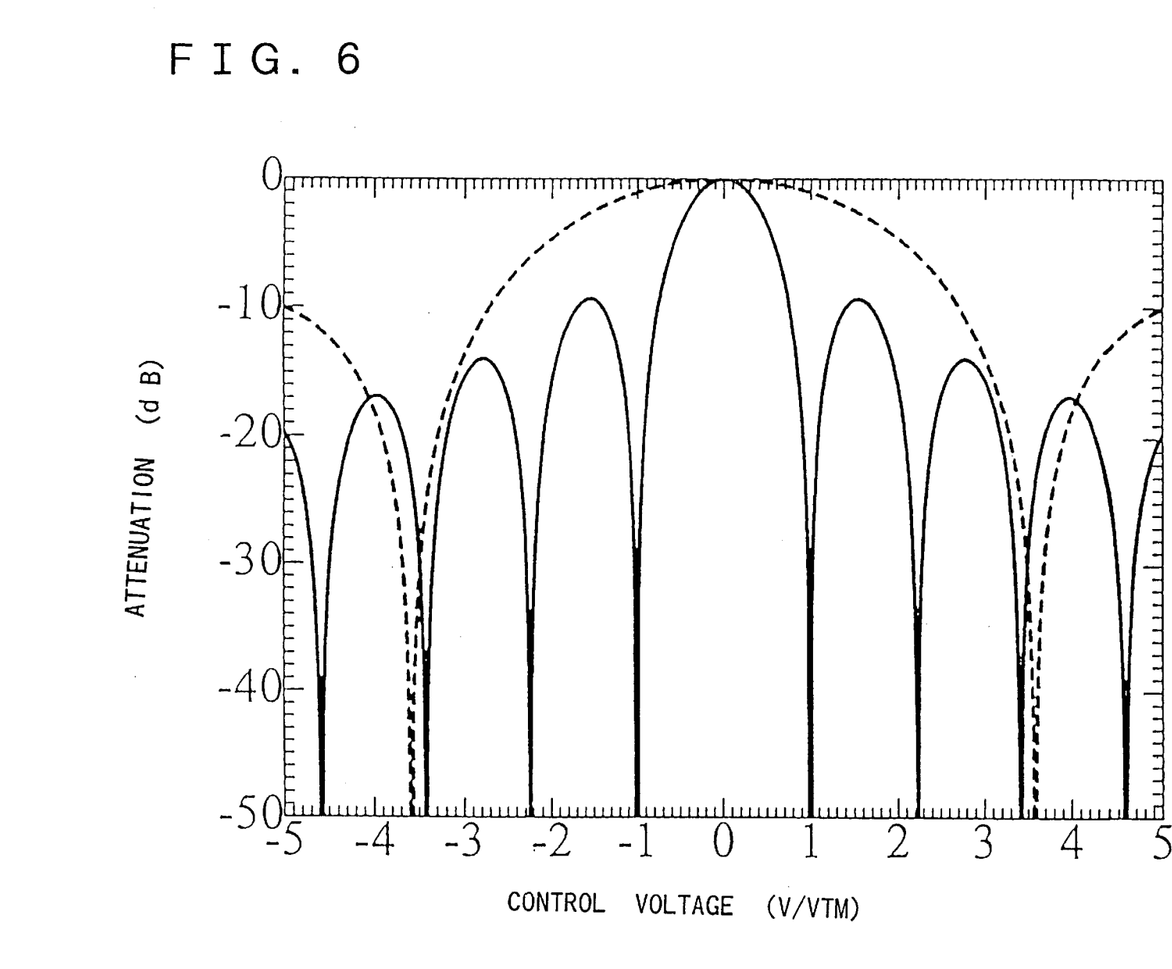
FIG. 6 is a diagram showing an example of an attenuation characteristic in which attenuation is plotted against control voltage of the optical waveguide electrically controlled variable attenuator according to the prior art shown in FIG. 5.

FIG. 6 illustrates an example of the attenuation characteristic of the output light 3b plotted against the control voltage V(9a). More specifically, the control voltage V(9a) is plotted along the horizontal axis and the amount of attenuation (expressed in decibels) is plotted along the vertical axis. Here the intensity of light is normalized by the optical waveguide 6a, and the applied voltage is normalized by a voltage (referred to also as "switching voltage") VTM which attenuates the TM mode light to the maximum extent. Accordingly, by controlling the control voltage V(9a), the attenuator makes it possible to vary the amount of attenuation of the input light 3a at will.

Figure 7:
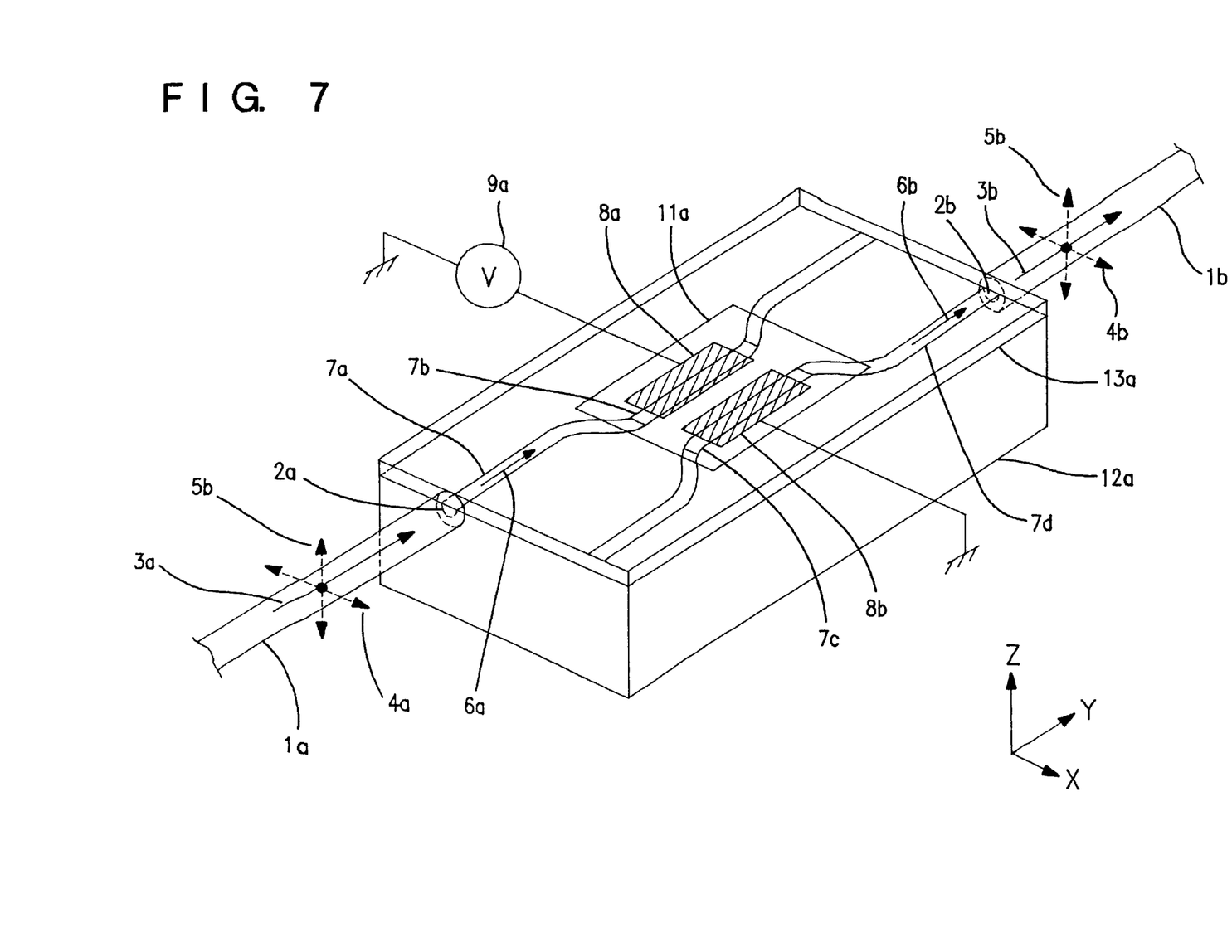
FIG. 7 is a diagram showing another example of the construction of an optical waveguide electrically controlled variable attenuator according to the prior art.

FIG. 7 illustrates another example of the construction of an optical waveguide electrically controlled variable attenuator using an optical switch of directional coupler type according to the prior art.

As shown in FIG. 7, the conventional attenuator is such that the optical waveguide 7 is fabricated in the shape illustrated in the surface of the substrate 12a made up of a lithium niobate (LiNbO$_3$) X-plate(X-cut crystal). A portion having an index of refraction slightly higher than that of the substrate 12a is the optical waveguide 2. The optical waveguide 7 is formed by Titanium (Ti) thermal diffusion method into the substrate. A buffer layer 13a consisting of silicon dioxide ($SiO_2$) is provided on the optical waveguide 7, and control electrodes 8a, 8b are provided on the buffer layer 13a.

With this electrically controlled variable optical attenuator of optical waveguide type according to the prior art, the signal light 3a from an erbium-doped fiber impinges upon the input port 2a. The component of the electric field of the entrant light that is parallel to the substrate is TE (Transverse Electric) mode 4, and the component of the electric field of the entrant light that is orthogonal to the substrate is TM (Transverse Magnetic) mode 5.

In a case where voltage is not being applied upon the control electrodes 8a, 8b, guided light 6a that has entered from the input port 2a is acted upon in the directional coupler 11a in such a manner that optical power is transferred from optical waveguide 7b to the adjacent optical waveguide 7d, travels through optical waveguide 7c on the output side and exits to an output fiber 1b from an output port 2b.

In this optical waveguide electrically controlled variable attenuator according to the prior art, the directional coupler switch 11a is designed to have such a switch length (the length of the switch decided by optical waveguides 7b, 7c, referred to also as "complete coupling length") that the optical power will be transferred completely between the optical waveguides 7b, 7c. When voltage V (9a) is applied upon the control electrodes 8a, 8b in the directional coupler switch 11a, the index of refraction of the optical waveguides 7b, 7c immediately underlying the electrodes changes owing to electro-optic effects, as a result of which the intensity of the output light 3b changes.

Figure 8:
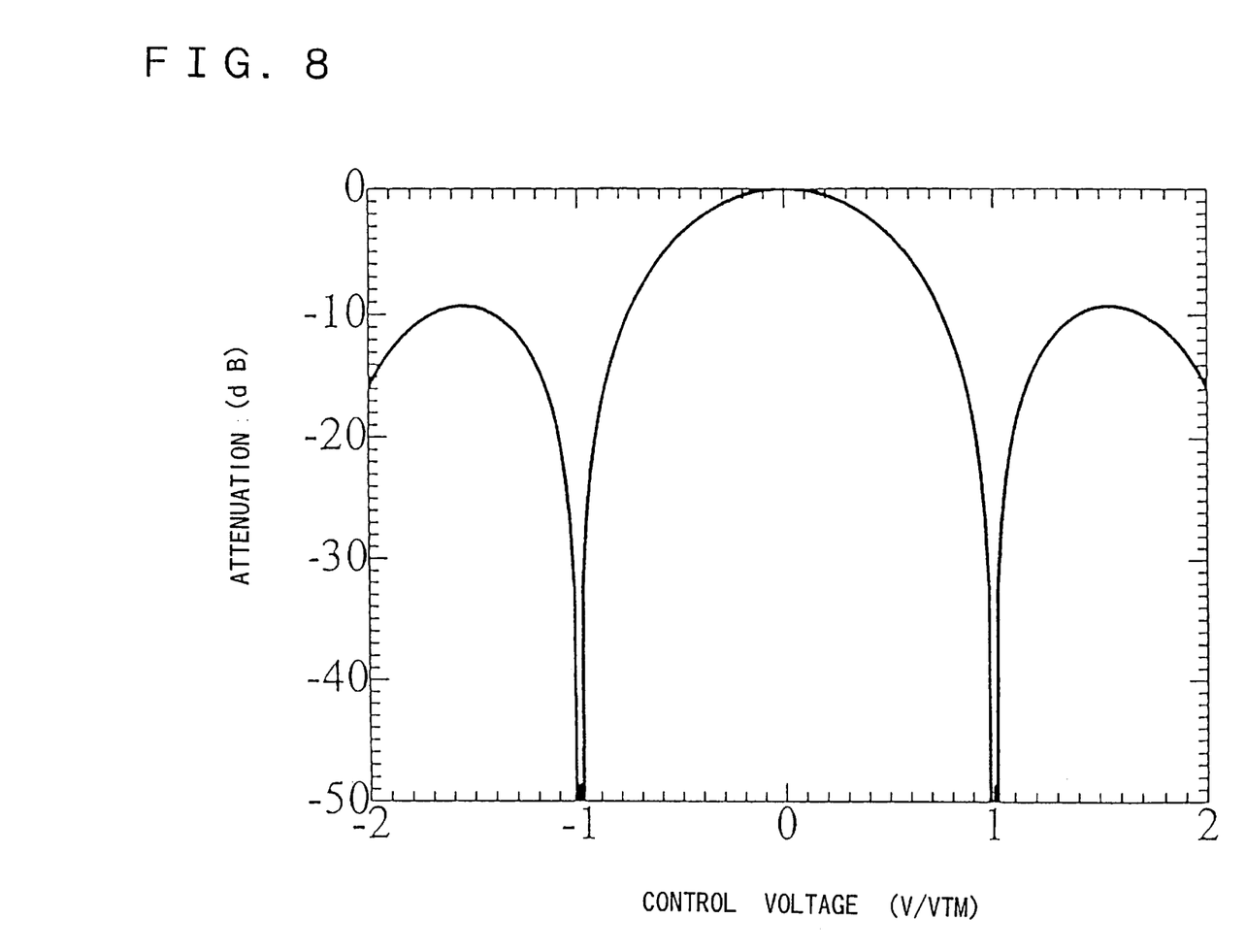
FIG. 8 is a diagram showing an example of an attenuation characteristic in which attenuation is plotted against control voltage of the optical waveguide electrically controlled variable attenuator according to the prior art shown in FIG. 7.

FIG. 8 illustrates an example of the attenuation characteristic of a TE mode 4b and a TM mode 5b plotted against the control voltage 9a. Here the intensity of light is normalized by the optical waveguide 6a, and the applied voltage is normalized by a voltage (referred to also as "switching voltage") VTM which attenuates the TM mode to the maximum extent. Accordingly, by controlling the control voltage V(9a), the attenuator makes it possible to vary the amount of attenuation of the input light 3a at will.

SUMMARY OF THE DISCLOSURE

The examples of the prior art described above have certain problems.

The problem with the example of the prior art shown in FIG. 5 is that the polarization dependency of the attenuation characteristic in the presence of the control voltage V(9a) is large. The reason for this is that since Z-cut Y-propagation lithium niobate is used for the substrate 12a, the sizes of the electro-optic constants used to obtain the attenuation characteristics differ for the TM mode 4 and TE mode 5. That is, we have the following for TE- and TM-polarized light (5,4):

TE mode electro-optic
constant $\gamma_{12} \approx 9 \times 10^{-12}$ m/V
TM mode electro-optic
constant $\gamma_{33} \approx 31 \times 10^{-12}$ m/V The problem with the example of the prior art shown in FIG. 7 is that the control voltage is increased in comparison with the prior art of FIG. 5 in order to obtain an attenuation characteristic that is independent of polarization. The reason for this is that X-cut Z-propagation lithium niobate is used for the substrate 12a. As a consequence, the electro-optic constant $\gamma_{22}$ for the TE and TM modes is about $3 \times 10^{-12}$ m/V for FIG. 7, as opposed to the electro-optic constant $\gamma_{12}$ of about $9 \times 10^{-12}$ m/V for the TE mode and the electro-optic constant $\gamma_{33}$ of about $31 \times 10^{-12}$ m/V for the TM mode in the prior art of FIG. 5. Accordingly, the electro-optic constant in the prior art of FIG. 7 is about one-third of that in FIG. 5 for the TE mode and about one-tenth that in FIG. 5 for the TM mode.

Accordingly, the present invention has been devised in view of the foregoing circumstances, and it is an object thereof to provide an optical waveguide electrically controlled variable attenuator which is polarization independent and capable of operating at low voltage and high speed.

Further objects will become apparent in the entire disclosure.

According to a first aspect of the present invention, the foregoing object is attained by providing a novel optical waveguide electrically controlled variable attenuator. The attenuator comprises a dielectric substrate, an optical waveguide formed in the surface of the substrate, input/output ports provided in the optical waveguide, first and second directional coupler switches, a polarization beam splitter and a polarization beam coupler. An input portion of the polarization beam splitter is adopted as the input port, one output portion of the polarization beam splitter is connected to an input portion of the first directional coupler switch, an output portion of the first directional coupler switch is connected to one input portion of the polarization coupler, another output portion of the polarization beam splitter is connected to an input portion of the second directional coupler switch. Further, an output portion of the second directional coupler switch is connected to another input portion of the polarization coupler, and an output portion of the polarization coupler is adopted as the output port.

According to a second aspect of the present invention, there is provided an optical waveguide electrically controlled variable attenuator comprising a polarization beam splitter splitting entrant light from an input port into polarized light of a TM mode and polarized light of a TE mode; first and second directional coupler switches which variably attenuate the TM mode and TE mode, respectively; and a polarization coupler coupling the TM and TE modes from said first and second directional coupler switches and outputting output light. The ratio of control voltage of said first directional coupler switch to control voltage of said second directional coupler switch is adjusted to a ratio in such a manner that equal attenuation characteristics are obtained for both the TM and TE modes to obtain an attenuation characteristic that is independent of polarization.

According to a third aspect or a fourth aspect, there is provided an optical fiber amplifier for wavelength-multiplexing entrant light and excitation light, amplifying the amplified light by a rare-earth doped optical fiber, monitoring output light of said rare-earth doped optical fiber and varying attenuation factor of the output light of said rare-earth doped optical fiber by a variable attenuator in dependence upon results of monitoring, wherein an optical waveguide electrically controlled variable attenuator according to the first or second aspect is used as the variable attenuator.

The polarization beam splitter, polarity coupler switches and polarization coupler are formed using a Z-cut substrate of lithium niobate, and entrant light is separated into TE mode and TM mode by the polarization beam splitter. The TE and TM modes are variably attenuated by the respective directional coupler switches, after which the TE and TM modes are coupled and output by the polarization coupler.

By adjusting the control voltages of the respective directional coupler switches in such a manner that the TE and TM modes are equally attenuated, it is possible to achieve low-voltage, polarization-independent, high-speed variable attenuation.

Further, since use is made of the large electro-optic constants $\gamma_{13}$ and $\gamma_{33}$ in the attenuating operation, lower voltage can be used in comparison with a case in which the X-cut substrate of lithium niobate is used.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of an optical waveguide electrically controlled variable attenuator according to the present invention will be described with reference to the drawings.

Figure 1:
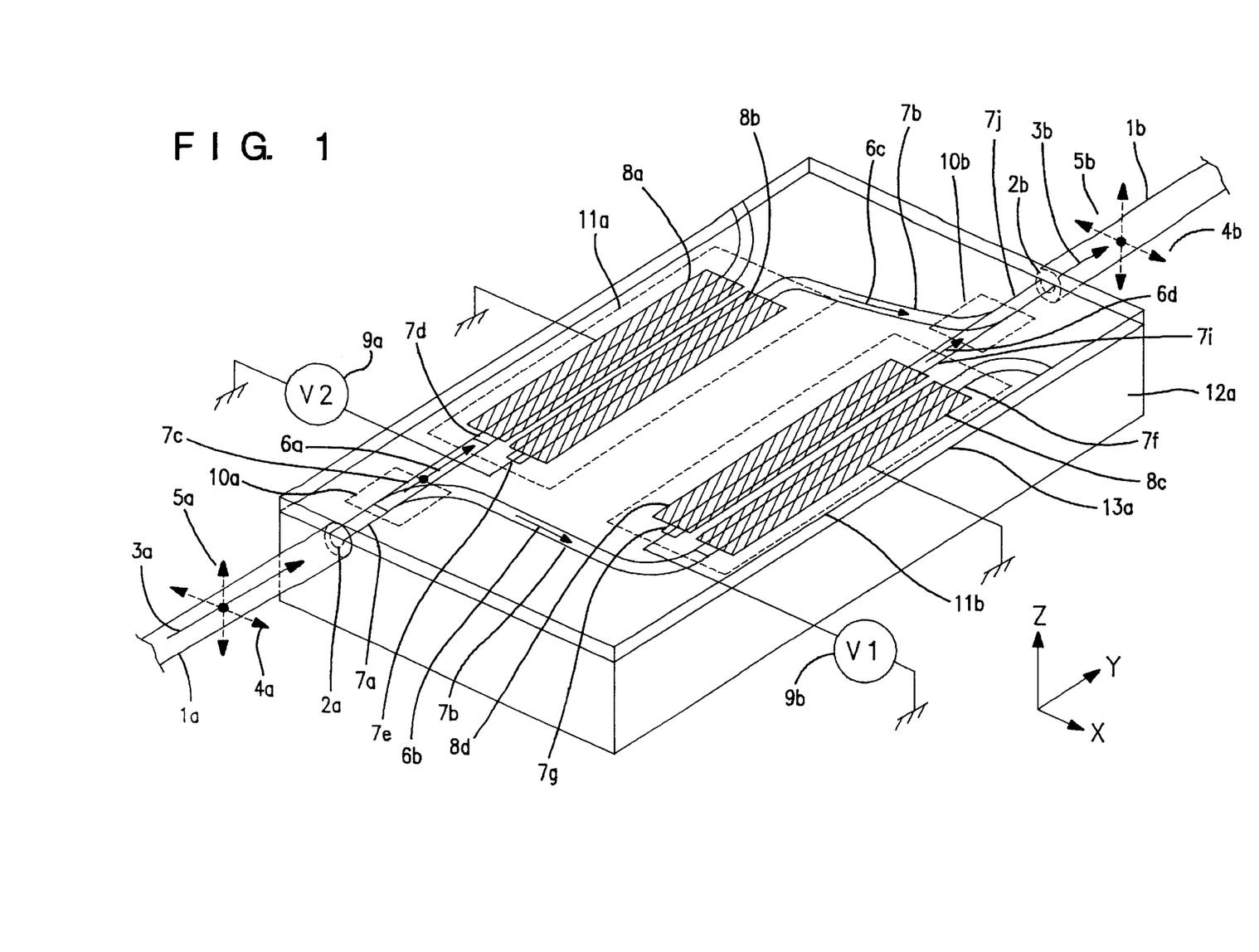
FIG. 1 is a perspective view illustrating the construction of an attenuator according to an embodiment of the present invention.

FIG. 1 is a perspective view illustrating the construction of an attenuator according to an embodiment of the present invention.

As shown in FIG. 1, an optical waveguide electrically controlled variable attenuator includes a dielectric substrate 12a, an optical waveguide 7 formed in the surface of the dielectric substrate 12a, input/output ports 2a, 2b provided in the optical waveguide 7, first and second directional coupler switches 11a and 11b, respectively, a polarization beam splitter 10a and a polarization coupler 10b. An input portion of the polarization beam splitter 10a is set as the input port 2a, one output portion of the polarization beam splitter 10a is connected to an input portion 7d of the first directional coupler switch 11a, an output portion of the first directional coupler switch 11a is connected to one input portion 7h of the polarization coupler 10b, another output portion of the polarization beam splitter 10a is connected to an input portion 7g of the second directional coupler switch 11b, an output portion of the second directional coupler switch 11b is connected to another input portion 7i of the polarization coupler 10b, and an output portion of the polarization coupler 10b is set as the output port 2b.

In accordance with this embodiment, the dielectric substrate 12a preferably comprises lithium niobate (LiNbO$_3$) and the lithium niobate substrate is Z-cut.

Further, according to this embodiment of the present invention, the polarization beam splitter 10a preferably comprises an optical waveguide produced by titanium diffusion and proton exchange.

Further, according to this embodiment of the present invention, the polarization coupler 10b preferably comprises an optical waveguide produced by titanium diffusion and proton exchange.

In this embodiment of the present invention, light 3a which has entered from the input port 2a is split into TM mode 6a and TE mode 6b by the polarization splitter 10a. After these modes 6a and 6b are variably attenuated by the directional coupler switches 11a and 11b, respectively, a resulting TM mode 6c and TE mode 6d are coupled by the polarization coupler 10b and output from the output port 2b. Control voltages V1,V2, (9b, 9a) of the directional coupler switches 11a, 11b are adjusted to a fixed ratio in such a manner that equal attenuation characteristics will be obtained for both the TM and TE modes 6a, 6b. This makes it possible to obtain an attenuation characteristic that is independent of the polarized light.

EXAMPLE

The preferred embodiment will now be described in greater detail with reference to an example.

The optical waveguide electrically controlled variable attenuator shown in FIG. 1 is fabricated using a Ti-diffused, Z-cut, Y-propagation substrate of lithium niobate. An example of a method of manufacturing this optical attenuator will be described first.

As shown in FIG. 1, a film of titanium (Ti) is deposited on the substrate 12a consisting of lithium niobate (LiNbO$_3$). After the film is subjected to patterning to obtain the patterns of optical waveguides, thermal diffusion is carried out for several hours to form the optical waveguides 7a, 7b, 7d, 7e, 7f, 7g, 7i and 7j.

This is followed by subjecting the optical waveguides 7c, 7h to patterning using an aluminum (Al) mask, after which a proton exchange is performed for several hours to form optical waveguides 7c and 7h.

Next, a buffer layer 13a is formed of thin film in order to suppress absorption of guided light by electrodes consisting of metal film, electrodes 8a, 8b are formed on the optical waveguides 7d, 7e, respectively, by metal film to fabricate the directional coupler switch 11a, and electrodes 8c, 8d are formed on the optical waveguides 7f, 7g, respectively, by metal film to fabricate the directional coupler switch 11b.

The input optical waveguide 7d of the directional coupler switch 11a is connected to the TM-mode output optical waveguide 7c of the polarization beam splitter 10a comprising the optical waveguides 7b, 7c, and the output optical waveguide 7e of the directional coupler switch 11a is connected to the TM-mode input optical waveguide 7h of the polarization coupler 10b comprising the optical waveguides 7h, 7i.

Further, the input optical waveguide 7f of the directional coupler switch 11b is connected to the TE-mode output optical waveguide 7c of the polarization beam splitter 10a comprising the optical waveguides 7b, 7c, and the output optical waveguide 7g of the directional coupler switch 11b is connected to the TE-mode input optical waveguide 7i of the polarization coupler 10b comprising the optical waveguides 7h, 7i.

The operation of the embodiment shown in FIG. 1 will now be described.

Light 3a that has entered the input port 2a from an input fiber 1a passes through the optical waveguide 7a and proceeds to the polarization beam splitter 10a where it is split into the TM mode 6a and TE mode 6b. The TM mode 6a enters the input optical waveguide 7d of the directional coupler switch 11a, and the TE mode 6b enters the input optical waveguide 7b of the directional coupler switch 11b.

The directional coupler switch 11a is fabricated so as to assume the crossed state in the absence of the control voltage V1 (9a). When V1=0 V holds, therefore, 100% of the TM mode 6a is transferred to the optical waveguide 7e. The amount of transfer of the TM mode Ga in the optical waveguide 7e decreases in dependence upon the control voltage V1 (9a).

Figure 2:
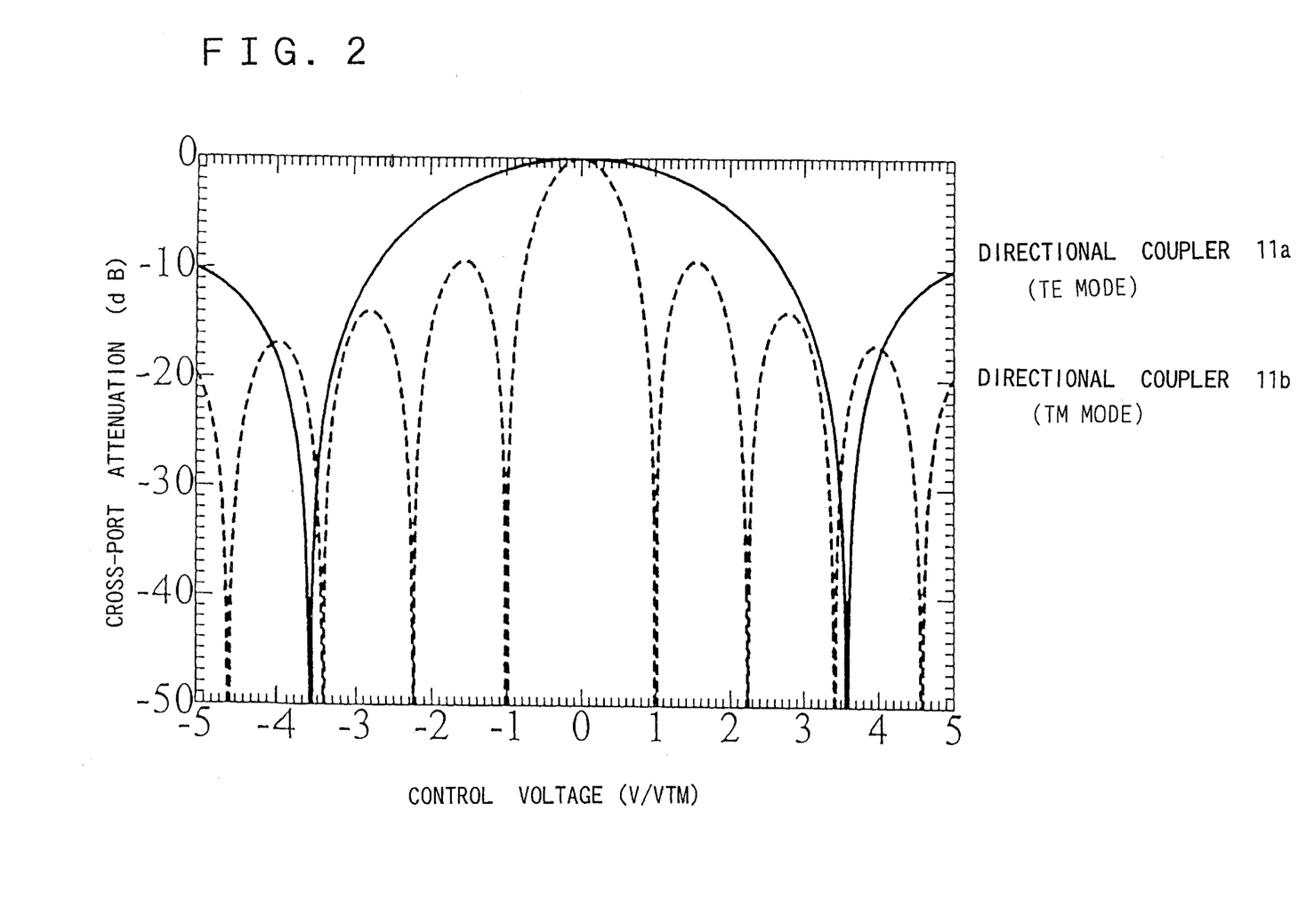
FIG. 2 is a diagram illustrating an example of an attenuation characteristic in which cross-port attenuation is plotted against control voltage of directional coupler switches according to this embodiment.

FIG. 2 shows the attenuation characteristic of the cross port (the output end of the optical waveguide 7e) of directional coupler switch 11a. Here the attenuation characteristic is normalized by the TM mode 6a, and the control voltage is normalized by the voltage (referred to also as "switching voltage") $V_{TM}$ which attenuates the TM mode 6a to the maximum extent.

The directional coupler switch 11b similarly is fabricated so as to assume the crossed state in the absence of the control voltage V2 (9b). When V2=0 V holds, therefore, 100% of the TE mode 6b is transferred to the optical waveguide 7g. The amount of transfer of the TE mode 6b in the optical waveguide 7g decreases in dependence upon the control voltage V2 (9b). The attenuation characteristic of the cross port (the output end of the optical waveguide 7g) of directional coupler switch 11b also is illustrated in FIG. 2.

If we let $V_{TM}$, $V_{TE}$ represent voltages which will maximize the amounts of attenuation of the cross ports of directional coupler switches 11a, 11b, the ratio thereof will be $V_{TM}:V_{TE}=1.3$.

It is possible to render the attenuation characteristics independent of polarization by applying the control voltages 9a, 9b at such a ratio (about V1:V2=1:3) that will equalize the amounts of attenuation of the cross ports of the directional coupler switches 11a and 11b.

Figure 3:
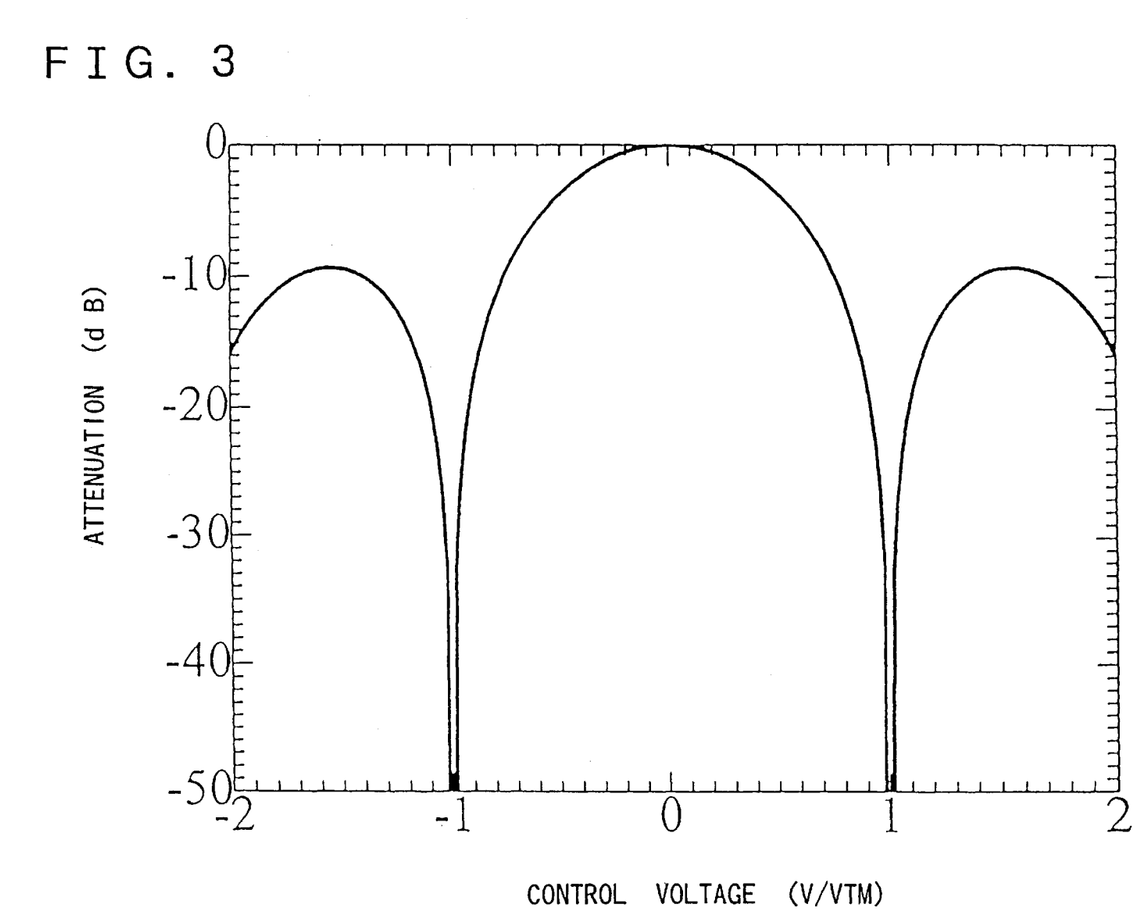
FIG. 3 is a diagram showing an example of an attenuation characteristic according to this embodiment.

FIG. 3 illustrates an example of the attenuation characteristic of the optical waveguide electrically controlled variable attenuator according to the present invention in a case where the control voltages 9a, 9b are applied at the fixed ratio (about V1:V2=1:3) that equalizes the amounts of attenuation of the cross ports. Here the attenuation characteristic is normalized by the incident light 3a, and the control voltage is normalized by the switching voltage $V_{TM}$ which maximizes the attenuation of the TM mode 6a.

A more detailed specific example of this embodiment of the invention will be described with reference to FIG. 1.

The input/output fibers 1a, 1b used were 1.55 μm single-mode fiber. Ultraviolet-curable coupling was used to fix the optical axes of the input/output ports 2a, 2b and input/output fibers 1a, 1b.

A Z-cut substrate of lithium niobate was used as the dielectric substrate 12a, and the Y axis was made the axis of propagation. The optical waveguides 7a, 7b, 7d, 7e, 7f, 7g, 7i and 7j were formed by performing thermal diffusion in a wet atmosphere for 8 hrs at a temperature of 1050° C. using a titanium film thickness of 50 nm and a titanium stripe width of 10 μm. This was followed by forming the optical waveguides 7c, 7h by effecting a proton exchange in a melt of benzoic acid for 3 min at a proton exchange temperature of 250° C. using an aluminum mask width of 9 μm, and performing annealing in a dry oxygen atmosphere for 2 hrs at a temperature of 360° C.

After the optical waveguides 7 were thus formed, the buffer layer 13a of silicon dioxide having a film thickness of 300 nm was formed by sputtering.

The electrodes 8 where formed by forming films of chromium (Cr) and gold (Au) having thicknesses of 30 nm and 300 nm, respectively, by sputtering, followed by patterning to furnish the electrodes with a width of 12 μm, an electrode spacing of 10 μm and an electrode length of 40 mm.

As a result of this process, insertion loss obtained in the absence of applied voltage was 2.7 dB and the maximum amount of attenuation obtained under application of a control voltage V1 (9a) of 4.5 V and a control voltage V2 (9b) of 14.1 V was 34.2 dB. Further, the polarization dependency of the attenuation characteristic was 0.1 dB or less when voltage was applied at a fixed ratio of V1:V2=1:3.13.

FIG. 4 is a diagram showing an example of an arrangement in which the optical attenuator according to this embodiment of the present invention is applied to an optical fiber amplifier. Specifically, the optical waveguide electrically controlled variable attenuator consisting of Ti-diffused, Z-cut, Y-propagation substrate of lithium niobate illustrated in FIG. 1 is employed as the variable optical attenuator 404 shown in FIG. 4.

The present invention has the following advantages:

(1) An attenuation characteristic that is independent of polarization can be obtained in an optical waveguide electrically controlled variable attenuator fabricated using a Z-cut substrate of lithium niobate. The reason for this is that entrant light is separated in the TE and TM modes by the polarization beam splitter 10a so that it is possible to obtain equal limit characteristics for both the TE and TM modes.

(2) When operation that is independent of polarization is achieved in an optical waveguide electrically controlled variable attenuator fabricated using a Z-cut substrate of lithium niobate, operation is possible at lower voltage in comparison with an optical waveguide electrically controlled variable attenuator fabricated using an X-cut substrate of lithium niobate. The reason for this is that a large electro-optic constant can be used in the attenuating operation.

As many apparently widely different embodiments of the present invention can be made without departing from the spirit and scope thereof, it is to be understood that the invention is not limited to the specific embodiments thereof except as defined in the appended claims.

What is claimed is:

1. An optical waveguide electrically controlled variable attenuator comprising:

a dielectric substrate;

an optical waveguide formed in a surface of said substrate;

input and output ports provided in said optical waveguide;

first and second directional coupler switches;

a polarization beam splitter; and a polarization coupler;

wherein an input portion of said polarization beam splitter is adopted as the input port, one output portion of said polarization beam splitter is connected to an input portion of said first directional coupler switch, an output portion of said first directional coupler switch is connected to one input portion of said polarization coupler, another output portion of said polarization beam splitter is connected to an input portion of said second directional coupler switch, an output portion of said second directional coupler switch is connected to another input portion of said polarization coupler, and an output portion of said polarization coupler is adopted as the output port.

2. The attenuator according to claim 1, wherein said substrate comprises lithium niobate.

3. The attenuator according to claim 2, wherein said lithium niobate is Z-cut.

4. The attenuator according to claim 1, wherein said polarization beam splitter comprises an optical waveguide produced by titanium diffusion and proton exchange.

5. The attenuator according to claim 1, wherein said polarization coupler comprises an optical waveguide produced by titanium diffusion and proton exchange.

6. The attenuator according to claim 1, wherein the ratio of control voltage of said first directional coupler switch to control voltage of said second directional coupler switch is 1:3 to 1:4.

7. An optical waveguide electrically controlled variable attenuator comprising;

a polarization beam splitter splitting entrant light from an input port into a TM mode and a TE mode;

first and second directional coupler switches which variably attenuate the TM mode and TE mode, respectively; and a polarization coupler coupling the TM and TE modes from said first and second directional coupler switches and outputting output light;

wherein the ratio of control voltage of said first directional coupler switch to control voltage of said second directional coupler switch is adjusted to a ratio in such a manner that equal attenuation characteristics are obtained for both the TM and TE modes to obtain an attenuation characteristic that is independent of polarization.

8. The attenuator according to claim 7, wherein a Z-cut, Y-propagation substrate of lithium niobate is used as a dielectric substrate on which said polarization beam splitter, said first and second directional coupler switches and said polarization coupler are formed.

9. An optical fiber amplifier for wavelength-multiplexing entrant light and excitation light, amplifying the amplified light by a rare-earth doped optical fiber, monitoring output light of said rare-earth doped optical fiber and varying attenuation factor of the output light of said rare-earth doped optical fiber by a variable attenuator in dependence upon results of monitoring, wherein an optical waveguide electrically controlled variable attenuator as defined in claim 1 is used as said variable attenuator.

10. An optical fiber amplifier for wavelength-multiplexing entrant light and excitation light, amplifying the amplified light by a rare-earth doped optical fiber, monitoring output light of said rare-earth doped optical fiber and varying attenuation factor of the output light of said rare-earth doped optical fiber by a variable attenuator in dependence upon results of monitoring, wherein an optical waveguide electrically controlled variable attenuator as defined in claim 8 is used as said variable attenuator.

* * * * *